US009195671B2

(12) United States Patent
Murthy et al.

(10) Patent No.: US 9,195,671 B2
(45) Date of Patent: Nov. 24, 2015

(54) INFRASTRUCTURE AND ARCHITECTURE FOR DEVELOPMENT AND EXECUTION OF PREDICTIVE MODELS

(71) Applicant: American Express Travel Related Services Company, Inc., New York, NY (US)

(72) Inventors: Narasimha Murthy, East Windsor, NJ (US); Mickey S. Oralevich, Great Neck, NY (US); Sandeep Sacheti, Edison, NJ (US); Deep Thomas, E. Brunswick, NJ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 72 days.

(21) Appl. No.: 13/687,858

(22) Filed: Nov. 28, 2012

(65) Prior Publication Data
US 2013/0091148 A1  Apr. 11, 2013

Related U.S. Application Data

(63) Continuation of application No. 12/100,219, filed on Apr. 9, 2008, now Pat. No. 8,341,166.

(51) Int. Cl.
*G06F 17/30* (2006.01)
*G06Q 30/02* (2012.01)

(52) U.S. Cl.
CPC .... *G06F 17/30091* (2013.01); *G06F 17/30864* (2013.01); *G06Q 30/02* (2013.01)

(58) Field of Classification Search
CPC ................. G06F 17/30091; G06F 17/30864
USPC ................... 707/758, 802, 804, 999.102
See application file for complete search history.

(56) References Cited

U.S. PATENT DOCUMENTS

| | | |
|---|---|---|
| 5,327,522 A | 7/1994 | Furuta et al. |
| 6,023,714 A | 2/2000 | Hill et al. |
| 6,029,176 A | 2/2000 | Cannon |
| 6,286,005 B1 | 9/2001 | Cannon |
| 6,430,539 B1 | 8/2002 | Lazarus et al. |
| 6,480,850 B1 | 11/2002 | Veldhuisen |
| 6,839,682 B1 | 1/2005 | Blume et al. |
| 7,165,037 B2 | 1/2007 | Lazarus et al. |
| 7,337,154 B2 | 2/2008 | Manson |
| 7,418,431 B1 | 8/2008 | Nies et al. |
| 7,610,233 B1 | 10/2009 | Leong et al. |

(Continued)

OTHER PUBLICATIONS

Yoshiteru Nakamori et al., Complex Systems Analysis and Environmental Modeling, 2000, Google, 178 - 189.*

(Continued)

*Primary Examiner* — Jean B Fleurantin
(74) *Attorney, Agent, or Firm* — Snell & Wilmer L.L.P.

(57) ABSTRACT

A system that enables development and execution of predictive models comprises a centralized data management system, a data extraction tool a model validation tool and a model execution tool. In embodiments, a data management system includes a data management server that can be accessed via a web browser that stores data in the form of a flat file. An extraction tool extracts data. A model validation tool validates a model by scoring an analytical environment data set and a production environment data set. A model execution tool allows a user to select when and how often a model is scored.

16 Claims, 6 Drawing Sheets

(56) References Cited

U.S. PATENT DOCUMENTS

| | | | |
|---|---|---|---|
| 7,657,299 | B2 | 2/2010 | Huizenga et al. |
| 7,730,003 | B2 | 6/2010 | Pinto et al. |
| 7,743,057 | B2 | 6/2010 | Jain et al. |
| 7,813,944 | B1* | 10/2010 | Luk et al. ............ 705/4 |
| 7,953,762 | B2* | 5/2011 | Agrawal et al. ........... 707/802 |
| 8,068,894 | B2 | 11/2011 | Huizenga et al. |
| 8,229,973 | B2* | 7/2012 | Agrawal et al. ........... 707/802 |
| 8,341,166 | B2* | 12/2012 | Murthy et al. ............ 707/758 |
| 8,515,862 | B2 | 8/2013 | Zhang et al. |
| 8,533,235 | B2 | 9/2013 | Agrawal et al. |
| 2002/0116282 | A1 | 8/2002 | Martin et al. |
| 2002/0152133 | A1* | 10/2002 | King et al. ............ 705/26 |
| 2002/0198801 | A1 | 12/2002 | Dixon et al. |
| 2003/0220860 | A1 | 11/2003 | Heytens et al. |
| 2004/0064351 | A1 | 4/2004 | Mikurak |
| 2004/0107125 | A1 | 6/2004 | Guheen et al. |
| 2004/0215599 | A1 | 10/2004 | Apps et al. |
| 2005/0043614 | A1 | 2/2005 | Huizenga et al. |
| 2005/0055193 | A1 | 3/2005 | Bondarenko |
| 2005/0055275 | A1 | 3/2005 | Newman et al. |
| 2005/0159996 | A1 | 7/2005 | Lazarus et al. |
| 2005/0234698 | A1* | 10/2005 | Pinto et al. ............ 703/22 |
| 2005/0262016 | A1 | 11/2005 | Hill et al. |
| 2006/0089894 | A1* | 4/2006 | Balk et al. ............ 705/35 |
| 2007/0011122 | A1 | 1/2007 | Hall et al. |
| 2007/0027843 | A1* | 2/2007 | Auerbach et al. ........... 707/3 |
| 2007/0094060 | A1 | 4/2007 | Apps et al. |
| 2007/0112615 | A1 | 5/2007 | Maga et al. |
| 2007/0156673 | A1* | 7/2007 | Maga et al. ............ 707/5 |
| 2007/0185867 | A1 | 8/2007 | Maga et al. |
| 2007/0239669 | A1 | 10/2007 | Ordonez et al. |
| 2008/0126030 | A1 | 5/2008 | Jain et al. |
| 2008/0126394 | A1 | 5/2008 | Jain et al. |
| 2008/0162574 | A1 | 7/2008 | Gilbert |
| 2008/0306908 | A1 | 12/2008 | Agrawal et al. |
| 2009/0037323 | A1 | 2/2009 | Feinstein et al. |
| 2009/0106085 | A1 | 4/2009 | Raimbeault |
| 2009/0119160 | A1 | 5/2009 | Woda et al. |
| 2009/0119161 | A1 | 5/2009 | Woda et al. |
| 2009/0119181 | A1 | 5/2009 | Pratt et al. |
| 2009/0192876 | A1 | 7/2009 | De et al. |
| 2009/0259664 | A1 | 10/2009 | Murthy et al. |
| 2009/0299896 | A1 | 12/2009 | Zhang et al. |
| 2010/0024037 | A1 | 1/2010 | Grzymala-Busse et al. |
| 2010/0161379 | A1 | 6/2010 | Bene et al. |
| 2010/0185079 | A1 | 7/2010 | Huizenga et al. |
| 2011/0099101 | A1 | 4/2011 | Emery et al. |
| 2011/0246385 | A1 | 10/2011 | Laxmanan et al. |
| 2012/0130226 | A1 | 5/2012 | Huizenga et al. |

OTHER PUBLICATIONS

USPTO; Notice of Allowance dated Apr. 2, 2012 in U.S. Appl. No. 13/090,147.

USPTO; Office Action dated Nov. 25, 2011 in U.S. Appl. No. 13/090,147.

M. P. Vanveen, J. G. M. Van Engelen and M. T. M. Van Raaij, "Crossing the River Stone by Stone: Approaches for Residential Risk Assessment for Consumers"—Pergamom, Ann. occup. Hyg. vol. 45, No. 1001, (pp. S107-S118) year 2000.

Steven H. Cohen & Associates, "Maximum Difference Scaling: Improved Measures of Importance and Preference for Segmentation", Copyright 2003, Sawtooth Software, Inc., (pp. 1-18).

WIPO; International Search Report dated May 26, 2009 for Int'l Appl No. PCT/US09/02207.

Makowski, Marek, "A Structured Modeling Technology." In EJOR: Advances in Complex System Modeling (online). Published Mar. 2004. pp. 1-38.

WIPO; International Search Report dated Jun. 2, 2009 for Int'l Appl No. PCT/US09/02209.

USPTO; Office Action dated Nov. 19, 2012 in U.S. Appl. No. 13/531,025.

USPTO: Office Action dated Nov. 29, 2010 in U.S. Appl. No. 12/100,219.

USPTO: Final Office Action dated Aug. 19, 2011 in U.S. Appl. No. 12/100,219.

USPTO: Advisory Action dated Oct. 21, 2011 in U.S. Appl. No. 12/100,219.

USPTO: Office Action dated Jan. 24, 2012 in U.S. Appl. No. 12/100,219.

USPTO: Notice of Allowance dated Aug. 30, 2012 in U.S. Appl. No. 12/100,219.

USPTO; Notice of Allowance dated Jan. 19, 2011 in U.S. Appl. No. 12/100,225.

USPTO; Final Office Action dated Oct. 29, 2010 in U.S. Appl. No. 12/100,225.

USPTO; Office Action dated Jul. 9, 2010 in U.S. Appl. No. 12/100,225.

Brown, Douglas R.—"A Review of Bio-Economic Models"—Sep. 2000, Cornell African Food Security and Natural Resource Management (CAFSNRM) Program—(p. 1-102) (aem.cornell.edu).

Alba, Enrique and Tomassini, Marco—"Parallelism and Evalutionary Algorithms"—IEEE Transactions on Evalutionary Computation, vol. 6, No. 5, Oct. 2002 (pp. 443-462).

Conguista et al.—"Parallel and Grid-Based Data Mining"—Algorithms, Models and Systems for High-Performance KDD, SpringerLink, Data Mining and Knowledge Discover Handbook, 2005, VI, (pp. 1017-1041).

Office Action dated Oct. 23, 2013 in U.S. Appl. No. 13/963,927.

Grigoris Karakoulos—"Empirical Validation of Retail Credit-Scoring Models" The RMA Journal, Sep. 2004 (pp. 56-60 (Retail Risk Management).

Notice of Allowance dated Jul. 16, 2014 in U.S. Appl. No. 13/963,927.

Final Office Action dated Apr. 28, 2014 in U.S. Appl. No. 13/963,927.

Sumathi, et al., "Data Mining in Customer Value and Customer Relationship Management", Introduction to Data Mining and its . . . , Studies in Computational Intelligence, 2006, pp. 321-386, 29, Springer-Verlag Berlin Heidelberg.

\* cited by examiner

INFRASTRUCTURE AND ARCHITECTURE FOR DEVELOPMENT AND EXECUTION OF PREDICTIVE MODELS

CROSS-REFERENCE TO RELATED APPLICATIONS

This application is a continuation of, claims priority to and the benefit of Ser. No. 12/100,219, U.S. Pat. No. 8,341,166 filed Apr. 9, 2008, entitled "INFRASTRUCTURE AND ARCHITECTURE FOR DEVELOPMENT AND EXECUTION OF PREDICTIVE MODELS," which is incorporated herein in its entirety.

BACKGROUND OF THE INVENTION

1. Field of the Invention

The present invention relates to predictive modeling, and specifically to reducing the time and resources required for developing, deploying, and executing a model.

2. Background of Invention

Direct marketing campaigns involve targeting a set of existing customers for a promotional offer. For example, credit card customers that charge a certain amount on travel purchases per month can be offered a credit card with travel rewards, because it is likely that they will accept the offer. Decision sciences and predictive modeling are used to estimate the likelihood (referred to herein as a score) that a particular customer will accept an offer. Thus, the effectiveness of a direct marketing campaign is related to the robustness of the predictive model on which it was based.

Because models are so integral to direct marketing campaigns, it is desirable to execute multiple models efficiently while reducing the time and effort it takes for model development and model deployment. In existing systems, there are deficiencies in model development, model deployment, and model execution. These deficiencies increase the time and cost of developing a model and how effectively a model can be executed.

In existing systems, data is stored in multiple disparate sources of customer data each having their own unique definitions and access requirements. When data is stored in multiple disparate sources, a modeler needs to standardize data and create data tables before data can be analyzed. This results in inconsistent results, compliance risks, and an overall low confidence in the outcomes.

In existing systems, implementing the model logic in the development phase is not a seamless process. In existing systems, models are often developed in one programming language and deployed in another programming language. Thus, implementing a model requires converting logic code into system compatible code. Converting model logic into a model that can be implemented requires using resources with high technical skills to translate logic into system compatible code. This can result in numerous errors and prolonged implementations which increases the time it takes for the deployment phase to be completed.

In some existing systems, model execution occurs at a mainframe location and is based on billing cycles. That is, customers are scored at the end of their billing cycle. Because customer billing cycles vary across a month (e.g. customer A's billing cycle ends the $15^{th}$ and customer B's billing cycle ends the $30^{th}$), it takes a full month to score a customer base. This is problematic because customer scores may change daily. Further, scores for the customers at the beginning of the billing cycle may be obsolete by the time the entire customer base is scored.

What is needed is an end-to-end integrated process of model development, model deployment, and model execution for customer marketing campaigns that enables rapid development and dynamic execution of models.

SUMMARY OF THE INVENTION

An infrastructure and architecture according to an embodiment of the present invention enables the rapid development and execution of predictive models. Exemplary embodiments provide solutions in the system design and process flow integration of model development, implementation, and execution for customer marketing campaigns.

Exemplary embodiments enable the rapid implementation of customer marketing models, rules, and segmentation strategies by logically integrating the three phases of customer marketing modeling. This enables significant reduction in the time-to-market of new strategies by reducing model deployment time. This reduced time-to-market allows companies to learn and respond to marketplace changes faster (e.g. adjust balance-transfer pricing to reflect reduction in prime rate).

In the execution phase, rapid assessments can occur using current data readily usable on demand. Further, exemplary embodiments can execute multiple models in a short time period using the most current customer data. This ensures ever-ready "scores" for customer marketing solutions. Exemplary embodiments can include quality controls built into the execution process that proactively track and notify input data anomalies and model volatility. Increases in model coverage across various channels/products complemented by rich, fresh, and accurate data provide major improvements in response rates and ultimately generate higher returns. For example, models may incorporate customer contact and product preferences enabling customized offers that generate higher response. Execution in exemplary embodiments allows businesses to respond immediately to changes in customer behavior. For example, customers who start showing an improved credit profile can be targeted selectively, in a much faster manner, for line increase offers.

In an embodiment, a system that enables development and execution of predictive models includes a centralized data management system, a data extraction tool, a model validation tool and a model execution tool.

In an embodiment, a data management system includes a data management server that can be accessed via a web browser that stores data in the form of a flat file. Further, a flat file may be a SAS data set.

In an embodiment, the data management system includes a data warehouse that stores data in the form of SQL variables.

In an embodiment, data to be extracted by the extraction tool appears in the form of a SAS data set and the extraction tool converts a SQL variable to a SAS variable.

In an embodiment, the extraction tool includes a privacy protection function that restricts user access to extracted data.

In an embodiment, the extraction tool includes a data filter adapted to filter data based on a population criteria, a sample size, and a date range criteria. Further, the data filter may filter data by combining criteria using logical operands. The data filter may also include a searchable data dictionary. The data filter can filter data based on the contents of an uploaded file.

In an embodiment, the model validation tool includes an intelligent code parser that checks a model for errors. Further, the model validation tool can validate a model by scoring an analytical environment data set and a production environment data set, and compare scores using a report. The model validation tool can validate a model using a pre-defined test case.

In an embodiment, the model execution tool allows a user to select when and how often a model is scored. The model execution tool can include an expiry date function that allows a user to specify how long a model will run. The model execution tool can score models using a SAS score engine.

In an embodiment, the model execution tool creates a plurality of variable files, each variable file referencing data variables used in models, wherein the variables referenced in a variable file are determined by a number of models that use a particular variable.

In an embodiment, the execution tool tracks model behavior against a baseline measure and alerts a user if model behavior deviates from the base line.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Model development occurs in what is called the analytic environment and involves building a model from customer data. Model development involves, without limitation, gathering customer data, analyzing customer data, creating model logic based on the analysis, and implementing the model logic. Gathering customer data typically involves generating and maintaining variables (e.g., household size, wallet size, income, travel expenses, etc.) using customer records. Systems may employ thousands of customer variables for tens of millions of customers. Analyzing customer data may involve analyzing customer variables to determine trends in customer behavior (e.g. customers with a higher income spend a greater percentage of their income on travel). Creating model logic may involve determining which of the thousands of variables will be used in a model and how they will be used to determine the likelihood a customer will behave in a certain way. For example, in a simple model, the likelihood of acceptance could be determined by the weighted average of a dozen variables. Implementing the model logic may involve putting the model into a form such that the model can be implemented in the development phase.

Model deployment may occur in what is called the production environment and involves testing the accuracy of the model against customer data to determine if the model contains any bugs and if the model achieves the expected results. Model deployment may involve actual customer scoring using previously-received marketing results.

Model execution involves using the model on live customer variable values where the results of the model are used to determine if an offer should be sent to a customer.

Figure 1:
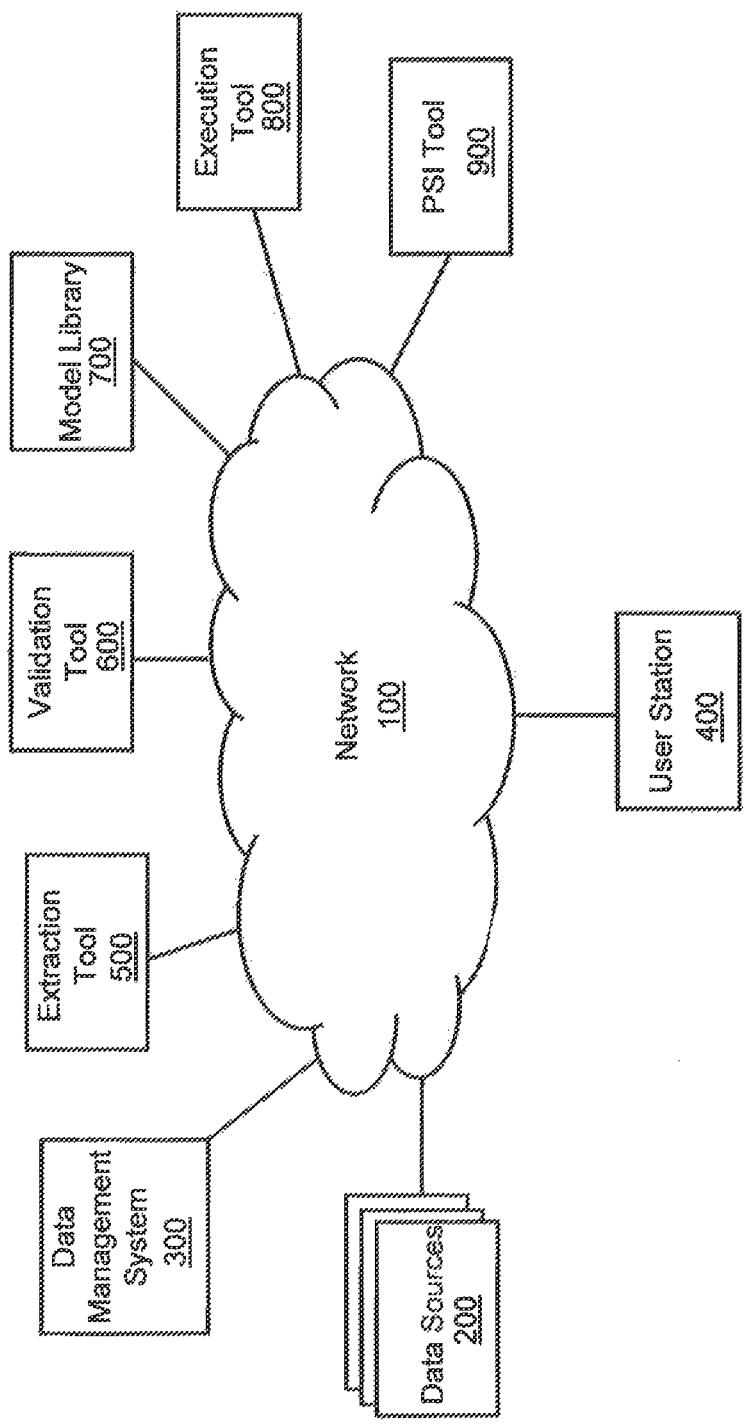
FIG. 1 provides a block diagram of an exemplary embodiment of a system for model development, deployment, and execution.
Figure 2:
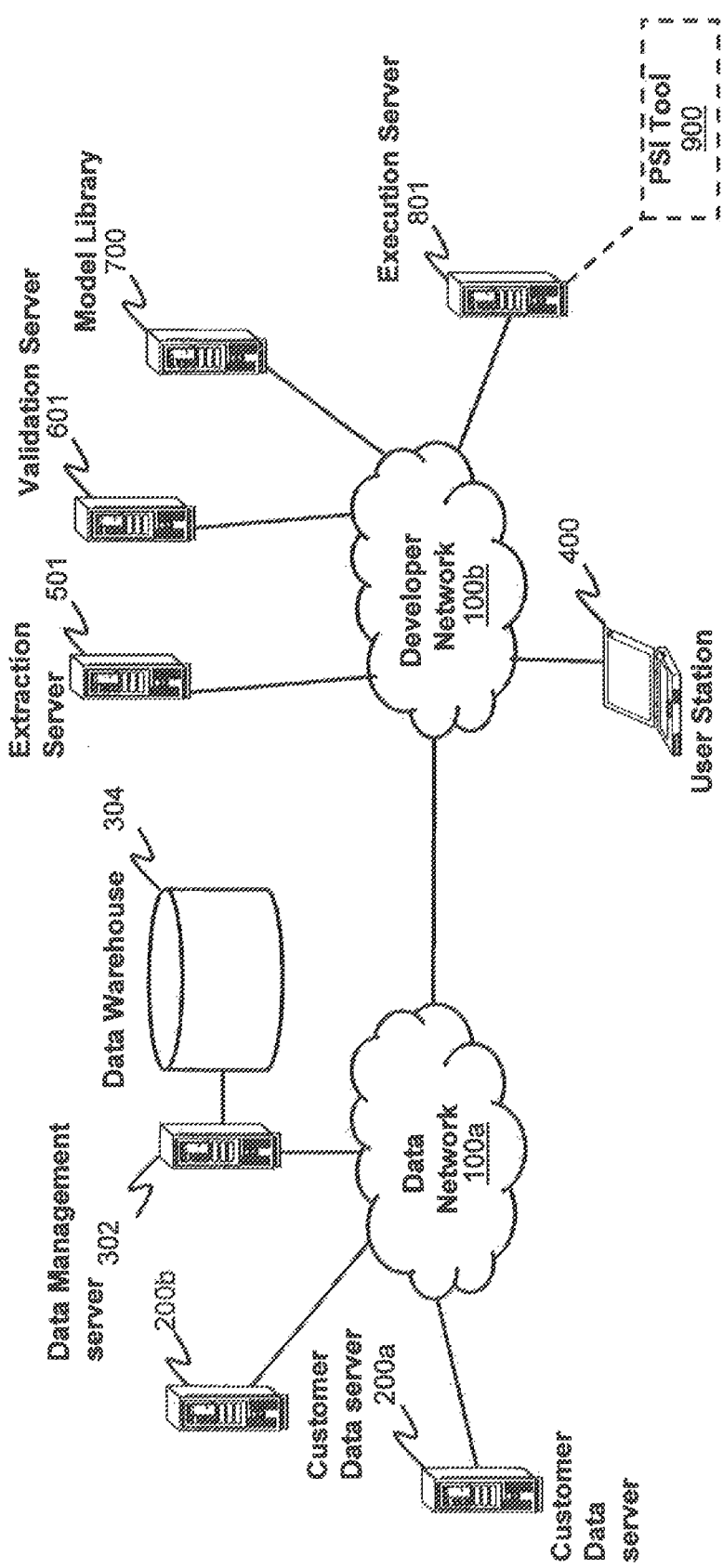
FIG. 2 provides an exemplary embodiment of a system for model development, deployment, and execution.

FIG. 1 provides a block diagram of an exemplary embodiment of a system 102 for model development, deployment, and execution. System 102 includes network 100, data sources 200, data management system 300, user station 400, extraction tool 500, validation tool 600, model library 700, execution tool 800, and population stability index (PSI) tool 900. It should be noted that although functional elements are illustrated as distinct blocks in FIG. 1, functional elements should not be construed as being distinct physical structures. Reference is made to FIG. 2 which illustrates system 102 embodied in a computer network architecture. It should be noted that although system 102 is described with respect to the credit card industry, the predictive modeling system can be used in many different industries, including, for example and without limitation, weather, retail, web search, transportation, communications, healthcare, hiring, and finance. Additionally, although extraction tool 500, validation tool 600, model library 700, execution tool 800, and PSI tool 900 are illustrated as embodied as being located at distinct locations on a computer network, one of ordinary skill in the art will recognize that this is for descriptive purposes only, as extraction tool 500, validation tool 600, model library 700, execution tool 800, and PSI tool 900 can be co-located anywhere on a computer network. For example, extraction tool 500, validation tool 600, and execution tool 800 may be located on a user station, such as user station 400 and model library 700 may be located on a central server, without departing from the spirit and scope of the present invention.

Network 100 is a communication network that allows communication to occur between the elements in the system. In the exemplary embodiment of FIG. 2, network 100 is illustrated as comprising a data network 100a and user network 100b. Although network 100 is shown as two networks in FIG. 2 network 100, network 100 can be any network or combination of networks that can carry data communication, and may be referred to herein as a computer network. Such network 100 can include, but is not limited to, a local area network, medium area network, and/or wide area network such as the Internet. Network 100 can support protocols and technology including, but not limited to, World Wide Web protocols and/or services. Intermediate web servers, gateways, or other servers may be provided between components of system 102 depending upon a particular application or environment.

Data sources 200 include systems that are sources of customer data. For example, data sources 200 may include data from the following exemplary systems: authorization systems, risk management systems, demographic systems, spend/bill systems, etc. In the exemplary embodiment of FIG. 2, data sources 200 are illustrated as multiple customer data servers 200a and 200b. Each data source 200 may have its own unique definitions and access requirements.

Data management system 300 processes and standardizes the data received from the various data sources 200. Processing and standardizing data may involve validating received data to insure the data does not contain errors, aggregating the received data to create aggregated data, and profiling the aggregated data so data trends across the customer base can be recognized. In one exemplary embodiment, data management system 300 uses software developed by the Ab Initio Software Corporation of Lexington, Mass. to perform the data processing and standardization. Data management system 300 provides centralized data that can be distributed across the system.

In the exemplary embodiment of FIG. 2, data management system 300 includes data management server 302 and optional data warehouse 304. Data management server 302 receives data from customer data servers 200a and 200b via data network 100a. Data management server 302 creates, for example, one feed per data source in the form of a flat file.

In an embodiment where a data warehouse 304 is used, data management server 302 may send the flat file to data warehouse 304. Data warehouse 304 converts the flat file into, for example, relational database table elements for storage. Data warehouse 304 can store thousands of data parameters for tens of millions of customers. In an exemplary embodiment, data is stored in data warehouse 304 in the form of SQL (Structured Query Language) variables. Data management system 300 can also include metadata dictionaries.

User station 400 provides an interface through which a modeler can develop, deploy, and execute a model. In the exemplary embodiment of FIG. 2, user station 400 is a computer with a web browser that allows a modeler to develop, deploy, and execute a model via a web portal.

Figure 3:
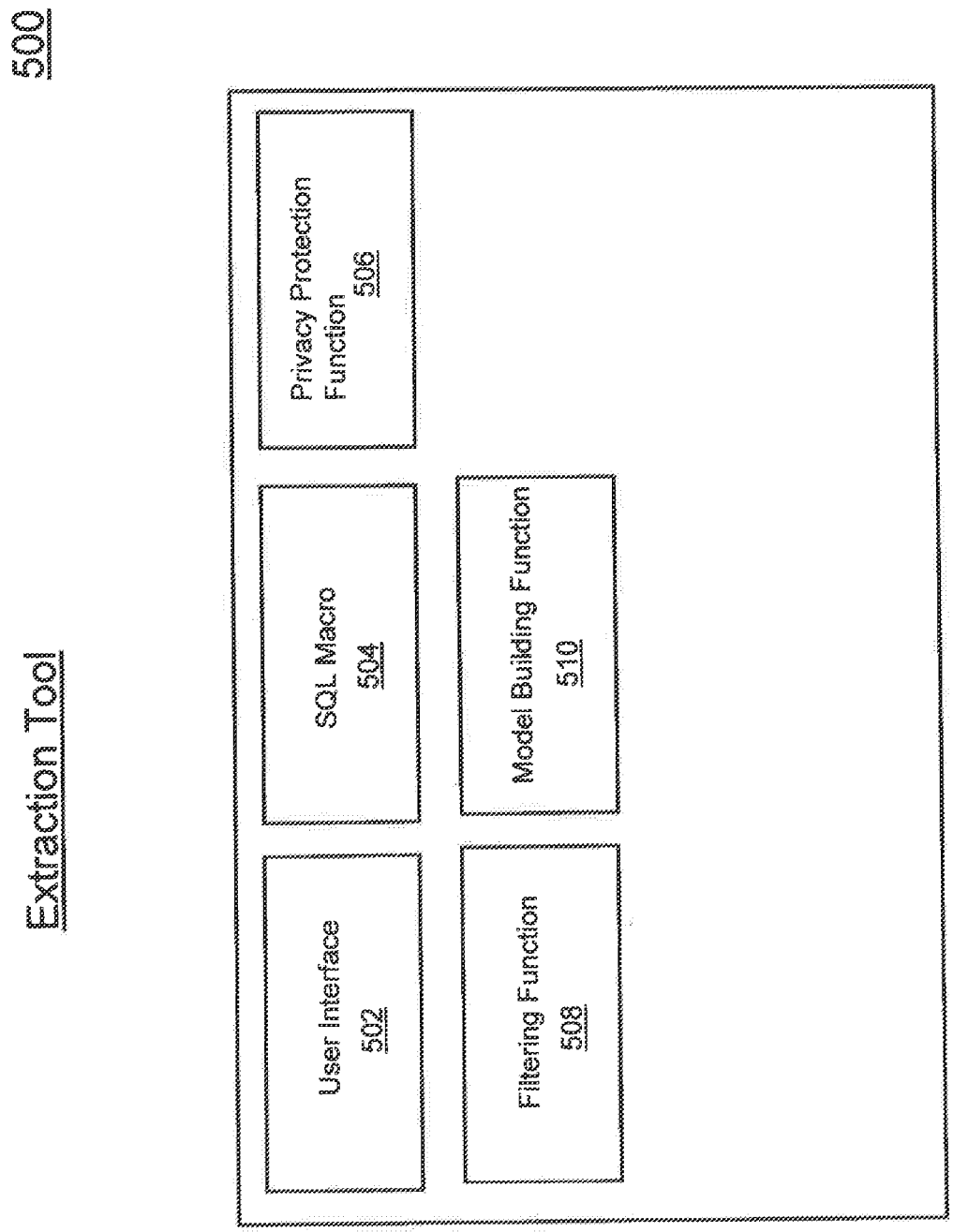
FIG. 3 provides a block diagram of an exemplary model extraction tool.

Extraction tool 500 is used by a modeler to complete the development phase of a model. In the exemplary embodiment of FIG. 2, extraction tool 500 is implemented in the form of an extraction server 501 that resides on developer network 100b. FIG. 3 provides a block diagram of an exemplary extraction tool 500. As shown in FIG. 3, model extraction tool 500 includes user interface 502, SQL Macro 504, privacy function 506, filtering function 508, and model building function 510.

Extraction tool 500 provides a modeler with a user interface 502 that allows a modeler to develop a model. In the exemplary embodiment, user interface 502 is a standard GUI (Graphical User Interface). Model development involves gathering customer data, analyzing customer data, creating model logic based on the analysis, and implementing the model logic.

As described above, data gathering may be completed by data management system 300. Thus, in an exemplary system, data gathering is transparent to the modeler. As such, the modeler need not standardize data nor create data tables before data can be analyzed. In an exemplary embodiment, variables on extraction tool 500 appear in the form of SAS datasets. The SAS variable names are standardized and consistent.

It should be noted that in some embodiments where data in the data management system 300 exists in the form of SQL variables on data warehouse 304, extraction tool includes a processing SQL macro 504 that converts SQL variables to SAS variables. This allows the end-user to work with SAS variables and avoid performing complex queries and joins. Thus, the modeler works with SAS datasets that can be directly plugged into a model.

In an embodiment where data is stored on data management server 302 as flat files, the flat files can be SAS flat files. Thus, SAS dataset extracts can be delivered directly to modelers on demand. The flat file architecture enables the optimization of system resources and provides improvements in the performance, efficiency, scalability, and user-experience of the extraction process compared to existing systems.

Further, the flat file architecture enables faster implementation of new data by removing the need to transform native data elements to relational database elements. In addition, there is no need to predefine all fields that will be stored. If the full source dataset is stored, new fields can be easily added by adding them to the extraction tool 500.

Flat file data storage typically costs less than data storage in a warehouse due to compression and lower indexing overhead. In addition, data warehouse 304 can be eliminated and all extracts run on data management server 302.

The ability to retain data in its native format without transforming it into relational database tables also enhances data compliance and security. Data does not have to be transferred from the data management server 302 to the data warehouse 304. Also, restrictions on accessing data directly on the data management server 302 may be in place, to increase data security for sensitive and confidential customer information. Management Information System (MIS) tools can also be embedded into data management server 302 to track capacity usage by data source, market, variable, organization, and/or modeler to allow management of the platform for maximum return. Further, an issue tracking database (not shown) may provide transparency reporting metrics to manage and optimize the performance and efficiency of extraction tool 500.

It should be noted that when a flat file architecture is used, the system does not significantly degrade as the amount of data it holds increases. In contrast, relational database warehouse performance may deteriorate as new amounts of data increases in the aggregate.

Privacy protection function 506 may be included to protect the privacy of the consumers. In an embodiment, privacy protection function 506 gives the modeler a temporary password when a modeler requests access to a data set. The temporary password allows access to the specific dataset and the ability to copy it to a user directory. Further, only authorized modelers may be able to access extraction tool 500.

Extraction tool 500 may be equipped with parallel processing and intelligent partitioning, prioritization, and routing capabilities. This is an alternative to data extraction processes that follow a sequential loading paradigm, which causes congestion and delays in the data extraction process. With parallel processing, multiple jobs can run at the same time and not create a backlog of requests. In addition, intelligent partitioning, prioritization, and routing capabilities allocate jobs based on estimated size, targeted population, and variables selected so multiple jobs can run against the database simultaneously and optimize CPU throughput.

Filtering function 508 allows a modeler to analyze a subset of the data stored by data management system 300. As noted above, data management system 300 may store thousands of variables for tens of millions of customers. Filtering function 508 may allow a modeler to filter data based on a population criteria. For example, a user can filter based on a credit card type, credit limit, household size, etc. Filtering function 508 may allow a modeler to filter data based on a sample size criteria. For example, a modeler can select a sample size of 0.1%, 1%, 5%, 10%, 20%, or 100% of the customer base. Further, a modeler may be able to upload a customer file of customers, allowing the filtering function 508 to return data for the customers in the file.

Filtering function 508 may have the ability to perform mathematical and logical operands on variables to segment a population in the data extract. For example, a modeler may specify all users with a credit limit of less than $10,000 and with a household size of less than two. Filtering function 508 may provide the modeler the ability to select history and date ranges. For example, a modeler may specify all users that charged over $1000 from September 2003-October 2003.

Filtering function 508 may also include a searchable online data dictionary with policy usage criteria for each variable.

Further, filtering function 508 may provide advanced searching features for variables. A modeler may also upload variables from a file and save variables to a file.

Once a modeler analyzes data, the modeler may create model logic based on the analysis using model building function 510. A modeler can create model logic by selecting the variables to be included in the model and specify how the variables will be used in the model to score a customer. Model logic may be created by a modeler writing model code for a model. In an exemplary embodiment, the model code is SAS code.

Model building function 510 allows a modeler to run a simulation of a model on customer data before the model is complete. Further, model building function 510 may allow a modeler to see a sample output of a model before the model is complete. Model building function 510 may allow a modeler to terminate a simulation or rerun a simulation while it is in progress. Further, simulations may be stored and shared. Model building function 510 may provide a modeler the ability to, for example and without limitation, save jobs as drafts, create a summary and a confirmation before submittal, extract jobs across multiple months and return in one dataset, estimate the size of output at job submission time, estimate the time of when a job will be completed, track the percent of completion, and/or upload and filter scrambled information. Further, in model building function 510, scored and rescored datasets may be combined into one consolidated dataset. Once a modeler is satisfied with a model, a modeler may submit the model. At this point, the model development phase is complete and the model deployment begins.

Figure 4:
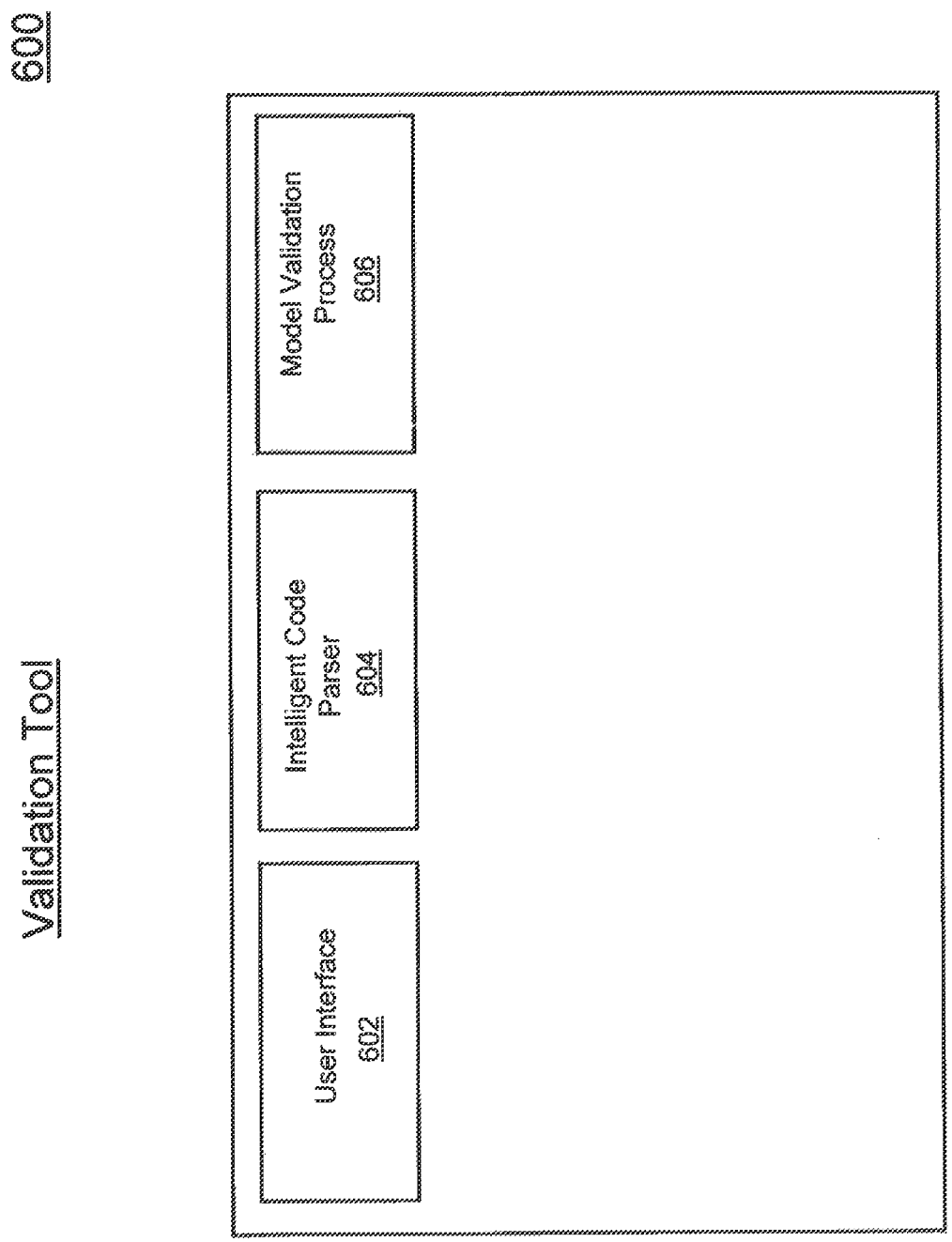
FIG. 4 provides a block diagram of an exemplary model validation tool.

Validation tool 600 may be used by a modeler to complete the development phase of a model. In the exemplary embodiment of FIG. 2, validation tool 600 is implemented in the form of a validation server 601 that resides on developer network 100*b*. FIG. 4 provides an exemplary block diagram of validation tool 600. As shown in FIG. 4, validation tool 600 includes user interface 602, intelligent code parser 604, and model validation process 606.

User interface 602 provides a modeler with an interface that allows a modeler to complete deployment of a model. In an exemplary embodiment interface 602 is a standard GUI interface.

Intelligent code parser 604 checks for and rejects erroneous code prior to deployment.

Model validation process 606 may provide all independent variables and "scores" for sign-off. Model validation process 606 allows a modeler to run a validation dataset against up to 100% of the data prior to deployment. This allows the modeler to validate the model and scores produced by the model prior to execution in the production environment. Further, model validation process 606 may allow the modeler to specify parameters on which customers should be scored, where the scores should be sent, and how frequently the scores should be updated. Further, a modeler can change priorities, and/or set limits on others wishing to use a model. Once these parameters are entered, then the model may run automatically without the need of manual intervention.

In an exemplary embodiment, model validation process 606 uses Syncsort software available from Syncsort Incorporated, of Woodcliff Lake, N.J., as an ETL (Extract Transform Load) tool that provides joining and loading of data from multiple files into one dataset for model logic deployment.

In an embodiment, model validation provides model scores in mainframe and warehouse variables in one dataset.

In an embodiment, validation reports are automated. That is, model validation process 606 captures the logs and profile reports of the validation datasets in both the production environment and the analytical environment. The two validation datasets are then measured to validate and ensure consistency across environments. Automating this eliminates the need for the modeler to manually validate a model.

In an embodiment, model validation process 606 includes advanced transparency tools to dissect model code logic in order to ensure best practices and optimize efficiencies. That is, model validation process 606 may give the modeler the capability to automatically obtain the code log and process steps. This allows economies of both time and scale to be achieved through standardization and sharing/leveraging best practices.

Validation process 606 may allow a modeler to create a list of pre-defined User-Acceptance Testing (UAT) cases that may be used by other modelers, thereby accelerating and automating the testing process.

Model validation process 606 may include a standardized list of validation rules to ensure comprehensive data testing procedures prior to implementation. Model validation process 606 may also include a request initiation, requirement gathering and data management checklist processes. Further, model validation process 606 may also include pre-approved policy approval for bulk data sources to eliminate manual steps and remove policy approval from a critical path. Model validation process 606 may allow creation of an audit trail and approval for requests. Once a modeler is satisfied with the results from validation tool 600, the modeler may deploy the model.

Model library 700 stores models that have been deployed by various modelers. In the exemplary embodiment of FIG. 2, model library 700 is implemented in the form of a model library server that resides on developer network 100*b*. At any given time, model library 700 can include thousands of models. In an exemplary embodiment, models are stored in the form of SAS models. Model library 700 may provide modelers the ability to update a model using a web interface after the model has been deployed. A robust quality and control process can be maintained to ensure compliance standards are strictly enforced in model deployment. The quality and control process can provide different access levels and rights depending on modeler credentials. The quality and control process can also provide an approval mechanism that requires a model to be approved before the model can be deployed.

Figure 5:
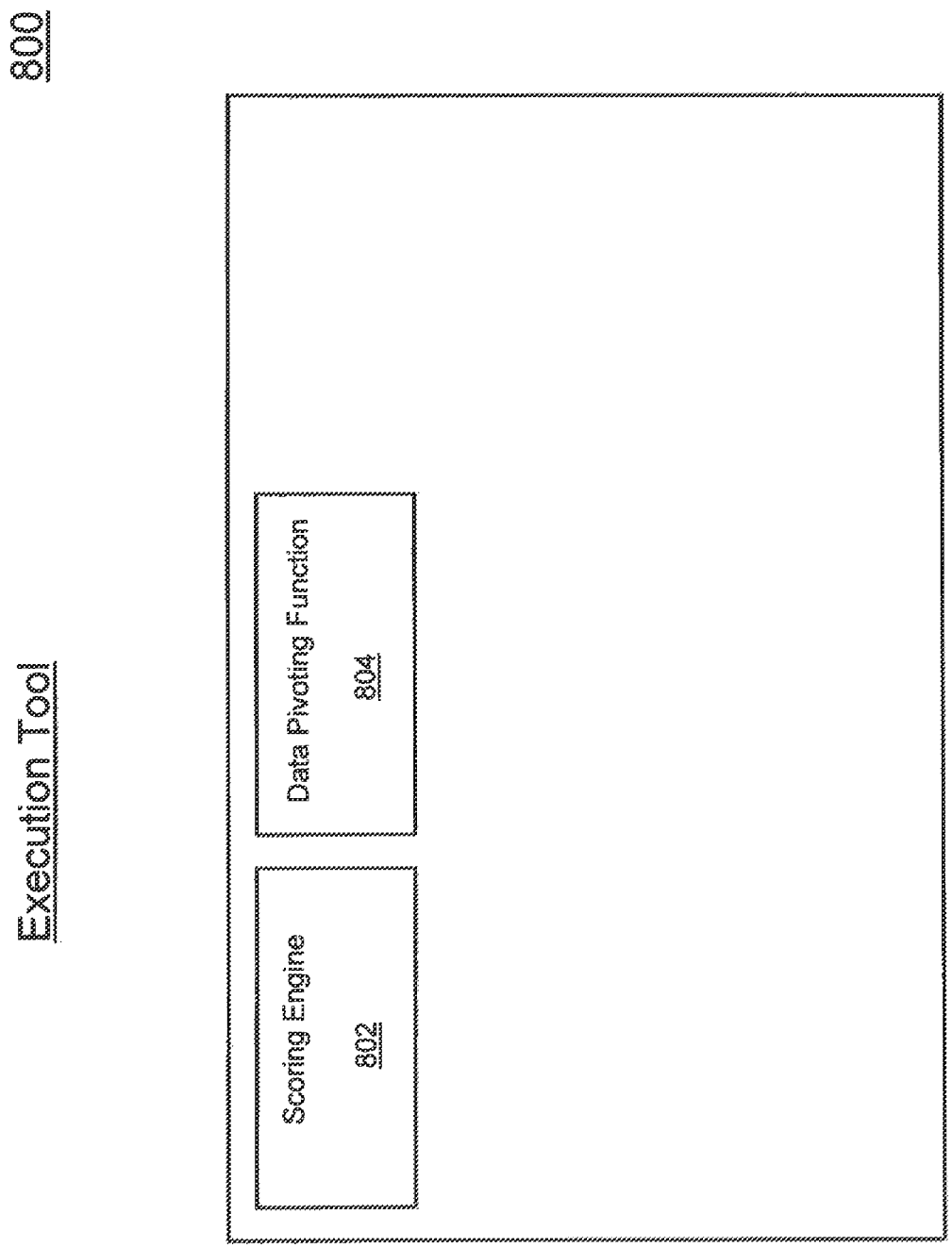
FIG. 5 provides a block diagram of an exemplary model execution tool.

Execution tool 800 scores deployed models based on the customer data stored in data management system 300. FIG. 5 provides a block diagram of an exemplary execution tool 800. As shown in FIG. 5, execution tool 800 includes score engine 802 and data pivoting function 804.

Score engine 802 is used to score models. In an exemplary embodiment, SAS is used as an engine to score models. When a model is being scored, execution tool 800 allows modelers to select when and how often their models will be scored. In an embodiment, a modeler can select when and how often their models are scored at any time during execution. The model can then run on an automated "lights-out" schedule. In general, "lights-out" refers to operation that is constantly occurring.

Problems can arise when obsolete models continue to run and consume massive amounts of system resources. Thus, in an embodiment, rather than models running lights-out on pre-defined automated intervals, a modeler may call models as needed to run for use in campaigns. Further, an expiry date function can be implemented. An expiry date function allows modelers to specify how long they want their model to run in the production environment.

In an embodiment where score engine 802 uses SAS, SAS parallelization allows multiple jobs to run in parallel as opposed to sequentially. This increases the performance and speed of model execution. Using the system of the exemplary embodiment, model scoring may occur using current data readily available on demand. Further, execution tool 800 may use resource utilization via parallel scheduling, intelligent data pivoting and optimization.

Data pivoting function 802 is targeted towards optimizing how data feeds are accepted from data management system 300. In an embodiment, during execution, execution tool 800 accepts the entire input file of all the variables for all of the customers in the data management system 300. However, most models use only a small portion of all of the variables. Further, the combination of the models being executed use only a small portion of all the variables. Thus, in an embodiment, data pivoting function 802 is used to improve the cycle time to score a large population by only utilizing active variables.

Data pivoting function 802 is structured on a self-learning process. When the data feeds are received from the data management system 300 (e.g. daily/weekly), data pivoting function 802 looks at all the "lights out" models in production and determines how many models need a particular variable from a given feed. Based on this information, the process breaks the input feed into multiple data files. The determination of how many split files need to be created and how many variables need to be placed in each split file is dynamically controlled through a configuration file.

An example configuration file may specify storing variables from a particular feed into split files as follows: storing all unused variables in a first split file, storing all variables used less than 9 times in a second split file, storing all variables used between 10 and 50 times in a third split file, and storing all variables used more than 50 times from a feed in a fourth split file.

If a particular file is not yielding expected results, then the parameters in the configuration file can be changed to change the split process for the next time data is received from data management system 300. Because the manner in which a feed is split for optimization is dependent upon the usage by models, data reflecting the number of split files and the variables residing on each split file at any given time may be maintained.

In the exemplary embodiment, model scores reside in a flat file architecture. Further, data related to model performance may be maintained for speed, accuracy, flexibility, and optimal maintenance. Data pivoting function 802 may allow only active variables in the metadata to be passed to the production environment to allow greater speed and execution.

Population Stability Index (PSI) tool 900 allows users to analyze and track the behavior and performance of models over time. In the exemplary embodiment of FIG. 2, PSI 900 is implemented in the form of software that resides on execution server 801. A baseline measure of the model is established and each consecutive run of that model is measured against that baseline. PSI tool 900 tracks the deviation of that model over time. If there is a statistically significant change, PSI tool 900 will capture that change and automatically alert the modeler.

Computer System Implementation

The present invention (i.e., system 102 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 6:
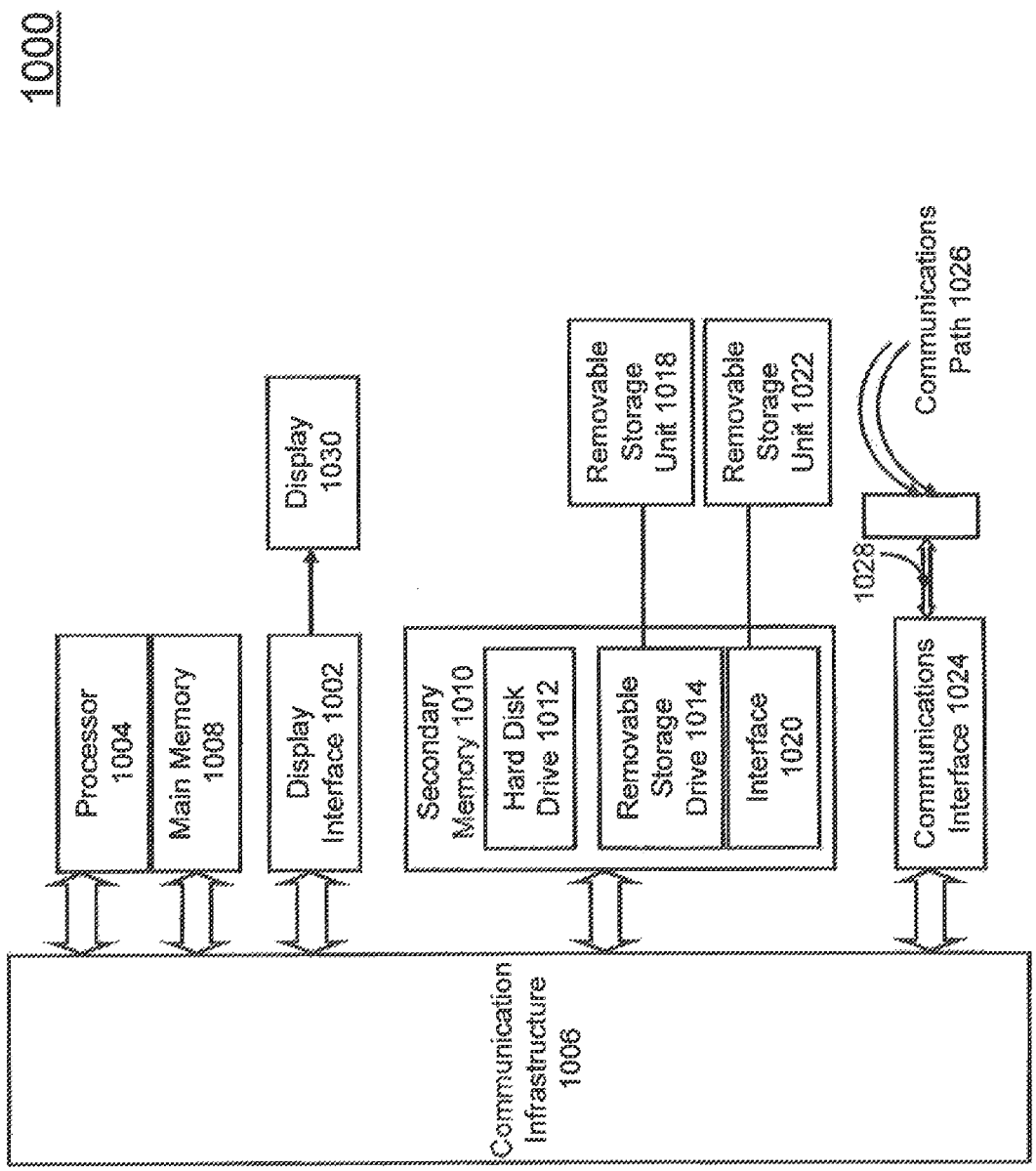
FIG. 6 is a diagram of a computer system on which the methods and systems herein described can be implemented.

In fact, in one embodiment, the invention is directed toward one or more computer systems capable of carrying out the functionality described herein. An example of a computer system 1000 is shown in FIG. 6.

The computer system 1000 includes one or more processors, such as processor 1004. The processor 1004 is connected to a communication infrastructure 1006 (e.g., a communications bus, cross over bar, or network). Various software embodiments are described in terms of this exemplary computer system. After reading this description, it will become apparent to a person skilled in the relevant art(s) how to implement the invention using other computer systems and/or architectures.

Computer system 1000 can include a display interface 1002 that forwards graphics, text, and other data from the communication infrastructure 1006 (or from a frame buffer not shown) for display on the display unit 1030.

Computer system 1000 also includes a main memory 1008, preferably random access memory (RAM), and may also include a secondary memory 1010. The secondary memory 1010 may include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018 represents a floppy disk, magnetic tape, optical disk, etc. which is read by and written to by removable storage drive 1014. As will be appreciated, the removable storage unit 1018 includes a computer usable storage medium having stored therein computer software and/or data.

In alternative embodiments, secondary memory 1010 may include other similar devices for allowing computer programs or other instructions to be loaded into computer system 1000. Such devices may include, for example, a removable storage unit 1022 and an interface 1020. Examples of such may include a program cartridge and cartridge interface (such as that found in video game devices), a removable memory chip (such as an erasable programmable read only memory (EPROM), or programmable read only memory (PROM)) and associated socket, and other removable storage units 1022 and interfaces 1020, which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a Personal Computer Memory Card International Association (PCM-CIA) slot and card, etc. Software and data transferred via communications interface 1024 are in the form of signals 1028 which may be electronic, electromagnetic, optical or other signals capable of being received by communications interface 1024. These signals 1028 are provided to communications interface N24 via a communications path (e.g., channel) 1026. This channel 1026 carries signals 1028 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 1014, a hard disk installed in hard disk drive 1012, and signals 1028. These computer program products provide software to computer system 1000. The invention is directed to such computer program products.

Computer programs (also referred to as computer control logic) are stored in main memory 1008 and/or secondary memory 1010. Computer programs may also be received via communications interface 1024. Such computer programs, when executed, enable the computer system 1000 to perform the features of the present invention, as discussed herein. In particular, the computer programs, when executed, enable the processor 1004 to perform the features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012 or communications interface 1024. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs), implementation of the hardware state machine so as to perform the functions described herein will be apparent to persons skilled in the relevant art(s).

In yet another embodiment, the invention is implemented using a combination of both hardware and software.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A system comprising:
a processor configured for enabling execution of a plurality of models;
a tangible, non-transitory memory communicating with the processor, the tangible, non-transitory memory having instructions stored thereon that, in response to execution by the processor, cause the processor to perform operations comprising:
converting, by the processor using a data extraction tool and using a Structured Query Language (SQL) macro, SQL variables to Statistical Analysis System (SAS) variables in SAS datasets;
extracting, by the processor using the data extraction tool, data from SAS flat files based at least in part on contents of uploaded customer files respectively associated with customers,
wherein the data comprises customer variables,
wherein the data extraction tool includes a user interface, the SQL macro, privacy function, filtering function, and a model building function,
wherein the data is gathered by a data management system;
analyzing, by the processor, the customer variables in the customer files to determine trends in customer behavior;
determining, by the processor, the customer variables to use in the plurality of models,
wherein the customer variables are in the form of SAS datasets;
determining, by the processor, model logic based on the customer variables and the trends in customer behavior;
enabling, by the processor, creation of the plurality of models based on the model logic; and
scoring, by the processor and based on the plurality of models, the customers at a scoring frequency.

2. The system of claim 1, further comprising receiving, by the processor, the data from a plurality of data sources, wherein the plurality of data sources comprise a financial risk management system and at least one of: an authorization system, a demographic system, and a spend/bill system.

3. The system of claim 1, further comprising: storing, by the processor, a set of variables in a plurality of split files based upon a frequency of use of each variable in the plurality of models; and reducing, based on the storing, a cycle time associated with a repeated execution of the plurality of models.

4. The system of claim 1, further comprising standardizing, by the processor, data stored in the SAS flat files.

5. The system of claim 1, further comprising validating, by the processor using a model validation tool, the plurality of models.

6. The system of claim 1, wherein the SAS flat file comprises a Statistical Analysis System (SAS) data set.

7. The system of claim 1, further comprising:
scoring, by the processor using a model validation tool, an analytical environment data set;
scoring, by the processor using the model validation tool, a production environment data set; and
comparing, by the processor using the model validation tool, scores generated by the analytical environment data set to scores generated by the production environment data set.

8. The system of claim 7, wherein results of the comparison between the scores generated by the analytical environment data set and the scores generated by the production environment are produced in a report.

9. The system of claim 1, further comprising validating, by the processor using a model validation tool, the plurality of models at least in part by using a pre-defined test case.

10. The system of claim 1, further comprising a model execution tool comprising an expiry date function that allows a user to specify how long the plurality of models will run.

11. The system of claim 1, wherein the scoring frequency further comprises an expiry date.

12. A method comprising:
converting, by a computer-based system configured for enabling execution of a plurality of models, Structured Query Language (SQL) variables to Statistical Analysis System (SAS) variables in SAS datasets, by using a data extraction tool and by using a SQL macro;
extracting, by the computer-based system using the data extraction tool, data from SAS flat files based at least in part on contents of uploaded customer files respectively associated with customers,
wherein the data comprises customer variables,
wherein the data extraction tool includes a user interface, the SQL macro, privacy function, filtering function, and a model building function,
wherein the data is gathered by a data management system;
analyzing, by the computer-based system, the customer variables in the customer files to determine trends in customer behavior;
determining, by the computer-based system, the customer variables to use in the plurality of models,
wherein the customer variables are in the form of SAS datasets;
determining, by the computer-based system, model logic based on the customer variables and the trends in customer behavior;
enabling, by the computer-based system, creation of the plurality of models based on the model logic; and
scoring, by the computer-based system and based on the plurality of models, the customers at a scoring frequency.

13. The method of claim 12, further comprising receiving, by the computer-based system, data from a plurality of data sources, wherein the plurality of data sources comprise a financial risk management system and at least one of: an authorization system, a demographic system, and a spend/bill system.

14. The method of claim 12, further comprising: storing, by the computer-based system, a set of variables in a plurality of split files based upon a frequency of use of each variable in the plurality of models; and reducing, based on the storing, a cycle time associated with a repeated execution of the plurality of models.

15. The method of claim 12, further comprising standardizing, by the computer-based system, data stored in flat files.

16. An article of manufacture including a non-transitory, tangible computer readable storage medium having instructions stored thereon that, in response to execution by a computer-based system configured for enabling execution of a plurality of models, cause the computer-based system to perform operations comprising:
converting, by the computer-based system using a data extraction tool and using a Structured Query Language (SQL) macro, SQL variables to Statistical Analysis System (SAS) variables in SAS datasets;
extracting, by the computer-based system using the data extraction tool, data from SAS flat files based at least in part on contents of uploaded customer files respectively associated with customers,
wherein the data comprises customer variables,
wherein the data extraction tool includes a user interface, the SQL macro, privacy function, filtering function, and a model building function,
wherein the data is gathered by a data management system;
analyzing, by the computer-based system, the customer variables in the customer files to determine trends in customer behavior;
determining, by the computer-based system, the customer variables to use in the plurality of models,
wherein the customer variables are in the form of SAS datasets;
determining, by the computer-based system, model logic based on the customer variables and the trends in customer behavior;
enabling, by the computer-based system, creation of the plurality of models based on the model logic; and
scoring, by the computer-based system and based on the plurality of models, the customers at a scoring frequency.

* * * * *